United States Patent
Kang et al.

(10) Patent No.: US 9,843,938 B2
(45) Date of Patent: Dec. 12, 2017

(54) METHOD AND APPARATUS FOR VIRTUALIZING ANTENNA IN WIRELESS COMMUNICATION SYSTEM

(71) Applicant: LG ELECTRONICS INC., Seoul (KR)

(72) Inventors: Jiwon Kang, Anyang-si (KR); Dongcheol Kim, Anyang-si (KR); Hangyu Cho, Anyang-si (KR); Sungho Park, Anyang-si (KR); Dongguk Lim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/424,402

(22) PCT Filed: Sep. 2, 2013

(86) PCT No.: PCT/KR2013/007894
§ 371 (c)(1),
(2) Date: Feb. 26, 2015

(87) PCT Pub. No.: WO2014/035216
PCT Pub. Date: Mar. 6, 2014

(65) Prior Publication Data
US 2015/0230102 A1 Aug. 13, 2015

Related U.S. Application Data

(60) Provisional application No. 61/695,309, filed on Aug. 31, 2012.

(51) Int. Cl.
*H04W 16/28* (2009.01)
*H04W 24/02* (2009.01)
(Continued)

(52) U.S. Cl.
CPC .......... *H04W 16/28* (2013.01); *H04B 7/0404* (2013.01); *H04B 7/0689* (2013.01);
(Continued)

(58) Field of Classification Search
CPC ..... H04W 16/28; H04W 24/02; H04W 88/08; H04B 7/0689; H04B 7/0871;
(Continued)

(56) References Cited

U.S. PATENT DOCUMENTS

2004/0110538 A1* 6/2004 Doi ............. H01Q 3/2605
455/562.1
2005/0254513 A1 11/2005 Cave et al.
(Continued)

FOREIGN PATENT DOCUMENTS

CN 101155012 4/2008
CN 101278499 10/2008
(Continued)

OTHER PUBLICATIONS

PCT International Application No. PCT/KR2013/007894, Written Opinion of the International Searching Authority dated Dec. 13, 2013 20 pages.
(Continued)

*Primary Examiner* — Kamran Afshar
*Assistant Examiner* — Minjung Kim
(74) *Attorney, Agent, or Firm* — Lee Hong Degerman Kang & Waimey

(57) ABSTRACT

The present invention relates to a wireless communication system, and more specifically, disclosed are a method and an apparatus for virtualizing an antenna. A method for reconfiguring an antenna of a terminal in the wireless communication system, according to one embodiment of the present invention, comprises the steps of: the terminal transmitting an antenna reconfiguration request to a base station; the
(Continued)

terminal receiving from the base station information indicating authorization of the antenna reconfiguration request; the terminal transmitting antenna reconfiguration information to the base station when the information indicating authorization indicates the authorization of the antenna reconfiguration request; and the terminal receiving from the base station information confirming the completion of reconfiguration.

10 Claims, 11 Drawing Sheets

(51) Int. Cl.
*H04B 7/0404* (2017.01)
*H04B 7/08* (2006.01)
*H04B 7/04* (2017.01)
*H04L 5/00* (2006.01)
*H04B 7/06* (2006.01)
*H04W 88/08* (2009.01)

(52) U.S. Cl.
CPC .......... *H04B 7/0871* (2013.01); *H04W 24/02* (2013.01); *H04B 7/0469* (2013.01); *H04B 7/0617* (2013.01); *H04L 5/0016* (2013.01); *H04L 5/0023* (2013.01); *H04L 5/0048* (2013.01); *H04L 5/0091* (2013.01); *H04W 88/08* (2013.01)

(58) Field of Classification Search
CPC .. H04B 7/0404; H04B 7/0617; H04B 7/0469; H04L 5/0023; H04L 5/0091; H04L 5/0016; H04L 5/0048
See application file for complete search history.

(56) References Cited

U.S. PATENT DOCUMENTS

| | | |
|---|---|---|
| 2006/0056316 A1 | 3/2006 | Chandra et al. |
| 2007/0057843 A1 | 3/2007 | Chang et al. |
| 2007/0135161 A1* | 6/2007 | Molnar .................. H04B 7/024 455/553.1 |
| 2008/0064353 A1 | 3/2008 | McBeath et al. |
| 2009/0086648 A1* | 4/2009 | Xu ....................... H04B 7/0689 370/252 |
| 2009/0278743 A1 | 11/2009 | Wee |
| 2010/0189030 A1 | 7/2010 | Li et al. |
| 2010/0330940 A1 | 12/2010 | Sheynblat et al. |
| 2012/0064841 A1 | 3/2012 | Husted et al. |

FOREIGN PATENT DOCUMENTS

| | | |
|---|---|---|
| CN | 101288245 | 10/2008 |
| CN | 103210542 | 7/2013 |
| JP | 2008-278076 | 11/2008 |
| JP | 2010-503365 | 1/2010 |
| KR | 10-2010-0091876 | 8/2010 |
| WO | 2007040456 | 4/2007 |
| WO | 2010/005036 | 1/2010 |

OTHER PUBLICATIONS

European Patent Office Application Serial No. 13834264.7, Search Report dated Feb. 17, 2016, 10 pages.
State Intellectual Property Office of the People's Republic of China Application Serial No. 201380056510.4, Office Action dated Apr. 28, 2017, 16 pages.

* cited by examiner

FIG. 5
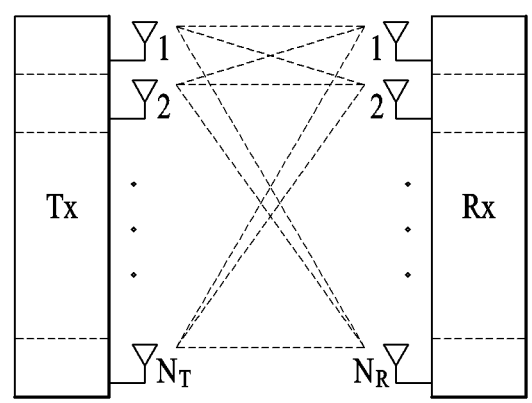
(a)
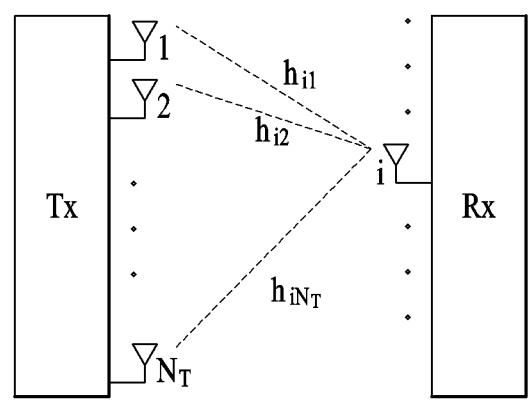
(b)

FIG. 9
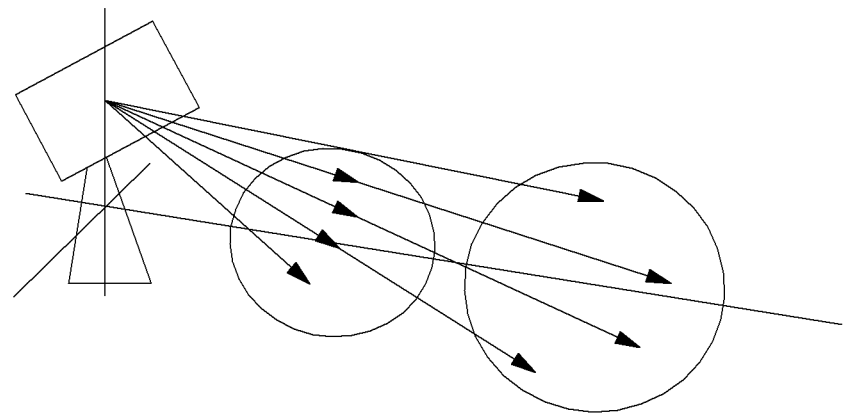
(a)
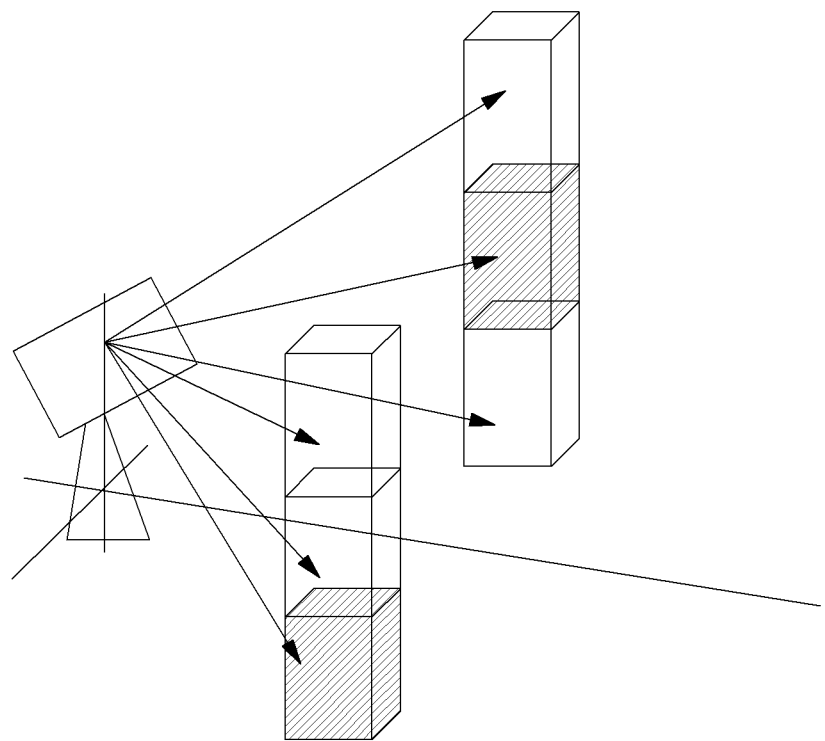
(b)

FIG. 10
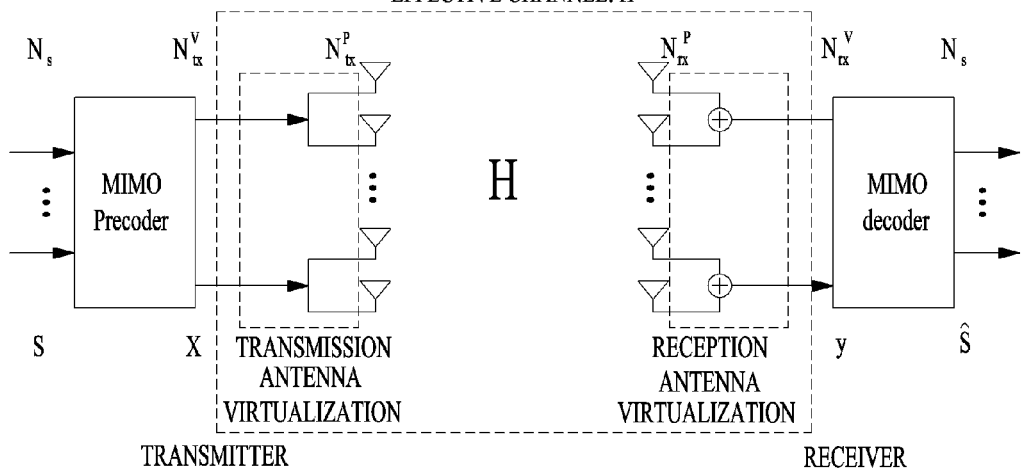
FIG. 11
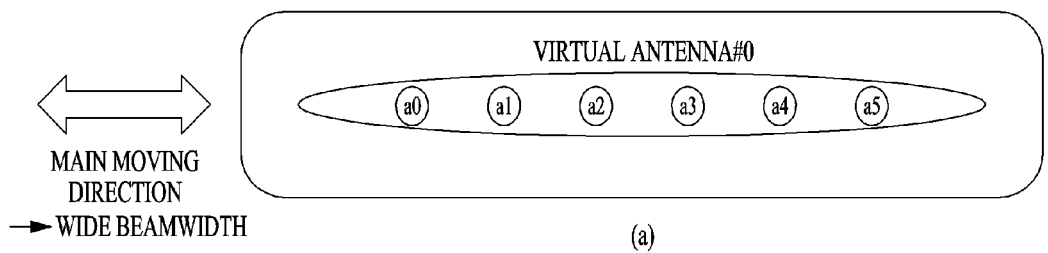
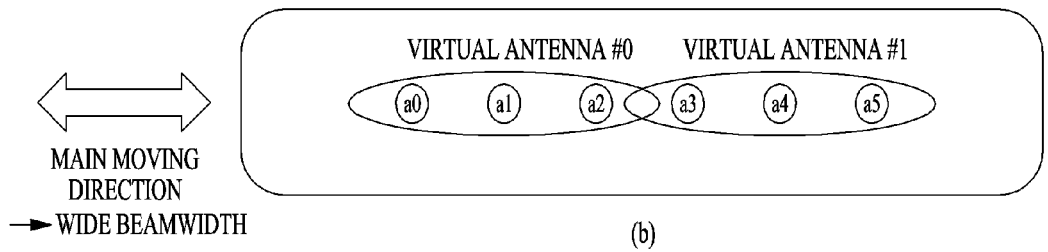

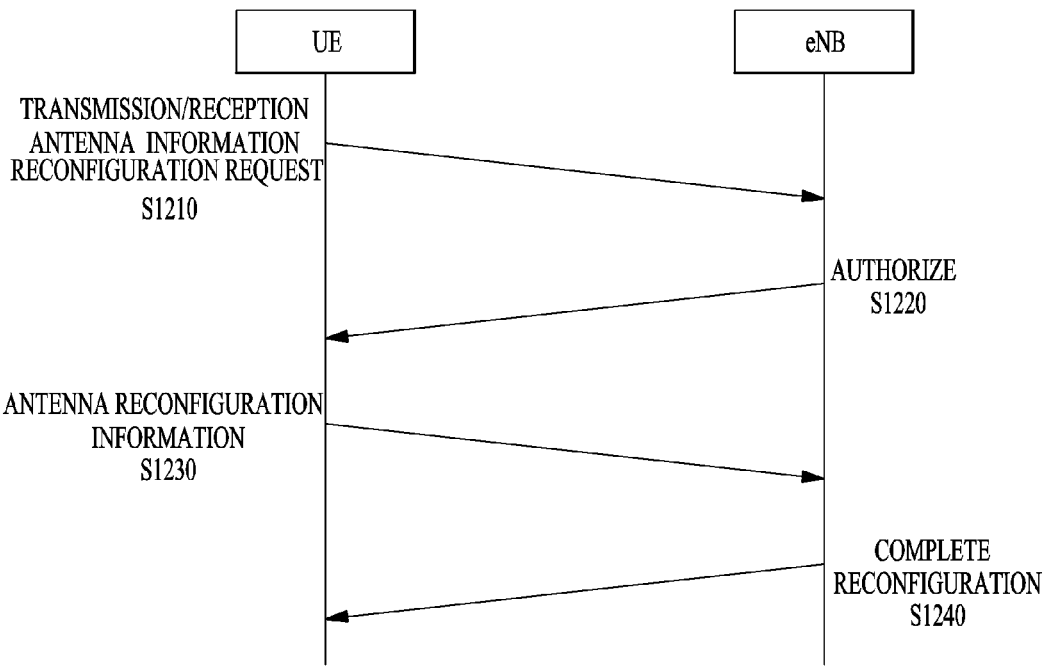
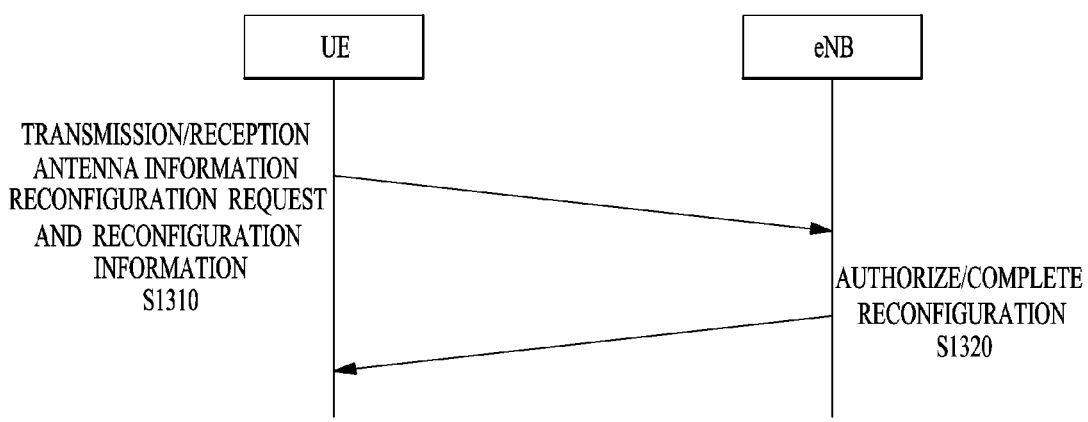

METHOD AND APPARATUS FOR VIRTUALIZING ANTENNA IN WIRELESS COMMUNICATION SYSTEM

CROSS-REFERENCE TO RELATED APPLICATIONS

This application is the National Stage filing under 35 U.S.C. 371 of International Application No. PCT/KR2013/007894, filed on Sep. 2, 2013, which claims the benefit of U.S. Provisional Application Ser. No. 61/695,309, filed on Aug. 31, 2012, the contents of which are all hereby incorporated by reference herein in their entirety.

TECHNICAL FIELD

The following description relates to a wireless communication system and, more specifically, to a method and apparatus for virtualizing an antenna.

BACKGROUND ART

MIMO (multiple-input multiple-output) refers to a method for improving data transmission/reception efficiency by adopting multiple transmit (Tx) antennas and multiple receive (Rx) antennas instead of a single Tx antenna and a single Rx antenna. When a single antenna is used, a receiver receives data through a single antenna path. However, when multiple antennas are used, the receiver receives data through multiple paths. Accordingly, a data transfer rate, throughput or signal-to-interference-and-noise-ratio (SINR) can be increased and coverage can be improved. A case in which both a transmitter and a receiver use a single antenna is referred to as SISO (Single-Input Single-Output), a case in which only the transmitter uses a plurality of antennas is referred to as MISO (Multiple-Input Single-Output), and a case in which only the receiver uses a plurality of antennas is referred to as SIMO (Single-Input Multiple-Output). In general, MIMO, SIMO, MISO and SISO schemes are commonly called MIMO technology.

To increase a multiplexing gain of MIMO operation, channel state information (CSI) can be fed back from an MIMO receiver and used for a MIMO transmitter. The receiver can determine the CSI by performing channel measurement using a predetermined reference signal (RS).

DISCLOSURE

Technical Problem

In enhanced wireless communication systems, support of more accurate beamforming is considered. As beamforming resolution increases, performance deterioration due to channel aging may be aggravated. Furthermore, as a moving speed of a UE increases, a channel that the UE suffers remarkably changes and thus performance deterioration due to channel aging may become serious.

An object of the present invention devised to solve the problem lies in a signaling method for reconfiguring antenna information between a base station and a UE rapidly and efficiently in adaptive application of an antenna virtualization pattern of the UE in consideration of a movement state and/or a communication state of the UE.

The technical problems solved by the present invention are not limited to the above technical problems and those skilled in the art may understand other technical problems from the following description.

Technical Solution

In an aspect of the present invention, a method for reconfiguring antennas by a terminal in a wireless communication system includes: the terminal transmitting an antenna reconfiguration request to a base station; the terminal receiving, from the base station, information indicating whether the antenna reconfiguration request is authorized; the terminal transmitting antenna reconfiguration information to the base station when the information indicating whether the antenna reconfiguration request is authorized indicates authorization of the antenna reconfiguration request; and the terminal receiving, from the base station, reconfiguration completion acknowledgement information.

In another aspect of the present invention, provided herein is a method for supporting antenna reconfiguration of a terminal by a base station in a wireless communication system, including: the base station receiving an antenna reconfiguration request from the terminal; the base station transmitting, to the terminal, information indicating whether the antenna reconfiguration request is authorized; the base station receiving antenna reconfiguration information from the terminal when the information indicating whether the antenna reconfiguration request is authorized indicates authorization of the antenna reconfiguration request; and the base station transmitting reconfiguration completion acknowledgement information to the terminal.

In another aspect of the present invention, provided herein is a terminal performing antenna reconfiguration in a wireless communication system, including: a transmitter; a receiver; and a processor, wherein the processor is configured to control: the terminal to transmit an antenna reconfiguration request to a base station using the transmitter; to receive, from the base station, information indicating whether the antenna reconfiguration request is authorized using the receiver; to transmit antenna reconfiguration information to the base station using the transmitter when the information indicating whether the antenna reconfiguration request is authorized indicates authorization of the antenna reconfiguration request; and to receive reconfiguration completion acknowledgement information from the base station using the receiver.

In another aspect of the present invention, provided herein is a base station supporting antenna reconfiguration of a terminal in a wireless communication system, including: a transmitter; a receiver; and a processor, wherein the processor is configured to control: the base station to receive an antenna reconfiguration request from the terminal using the receiver; to transmit, to the terminal, information indicating whether the antenna reconfiguration request is authorized using the transmitter; to receive antenna reconfiguration information from the terminal using the receiver when the information indicating whether the antenna reconfiguration request is authorized indicates authorization of the antenna reconfiguration request; and to transmit reconfiguration completion acknowledgement information to the terminal using the transmitter.

The following can be commonly applied to the aforementioned embodiments of the present invention.

The antenna reconfiguration information may include information on an antenna virtualization pattern of the terminal, the information on the antenna virtualization pattern of the terminal being determined on the basis of at least one of information indicating a movement state of the terminal and information indicating a communication state of the terminal.

The antenna virtualization pattern may include at least one of the total number of transmission virtual antennas, the total number of reception virtual antennas, the number of one or more physical antennas mapped to one virtual antenna and information specifying the one or more physical antennas.

The number of one or more physical antennas mapped to the one virtual antenna may be proportional to a moving speed of the terminal.

The information indicating the movement state may include at least one of information about whether the terminal is moving, information about a moving direction, information about a moving speed and information about an acceleration state or a deceleration state.

The information indicating the communication state may include at least one of information about a distance between the terminal and the base station, information about relative locations of the terminal and the base station and information about a channel state between the terminal and the base station.

The antenna virtualization pattern may be adaptively determined on the basis of a change of one or more of the information indicating the movement state of the terminal and the information indicating the communication state of the terminal.

The antenna reconfiguration information may be information indicating one of one or more predetermined antenna virtualization pattern candidates.

The terminal may set one or more virtual antennas according to the antenna virtualization pattern and perform communication with the base station using the one or more virtual antennas, after receiving the information indicating authorization of the antenna reconfiguration request or receiving the reconfiguration completion acknowledgement information.

The transmitting of the antenna reconfiguration request may be performed when the terminal does not perform data transmission and reception.

The transmitting of the antenna reconfiguration request and the transmitting of the antenna reconfiguration information may be performed through one signaling process.

The receiving of the information indicating authorization and the receiving of the reconfiguration completion acknowledgement information may be performed through one signaling process.

The above description and the following detailed description of the present invention are exemplary and are for additional explanation of the invention disclosed in the claims.

Advantageous Effects

According to embodiments of the present invention, it is possible to provide a signaling method for reconfiguring antenna information between a base station and a UE rapidly and efficiently in adaptive application of an antenna virtualization pattern of the UE in consideration of a movement state and/or a communication state of the UE.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a configuration of a wireless communication system having multiple antennas;
FIG. 9 illustrates exemplary beamforming according to a 2-dimensional antenna configuration;
FIG. 10 illustrates antenna virtualization;
FIG. 11 illustrates antenna virtualization adapted to UE state according to an embodiment of the present invention;
FIG. 12 illustrates an antenna reconfiguration method according to an embodiment of the present invention;
FIG. 13 illustrates an antenna reconfiguration method according to another embodiment of the present invention.

BEST MODE

Figure 1:
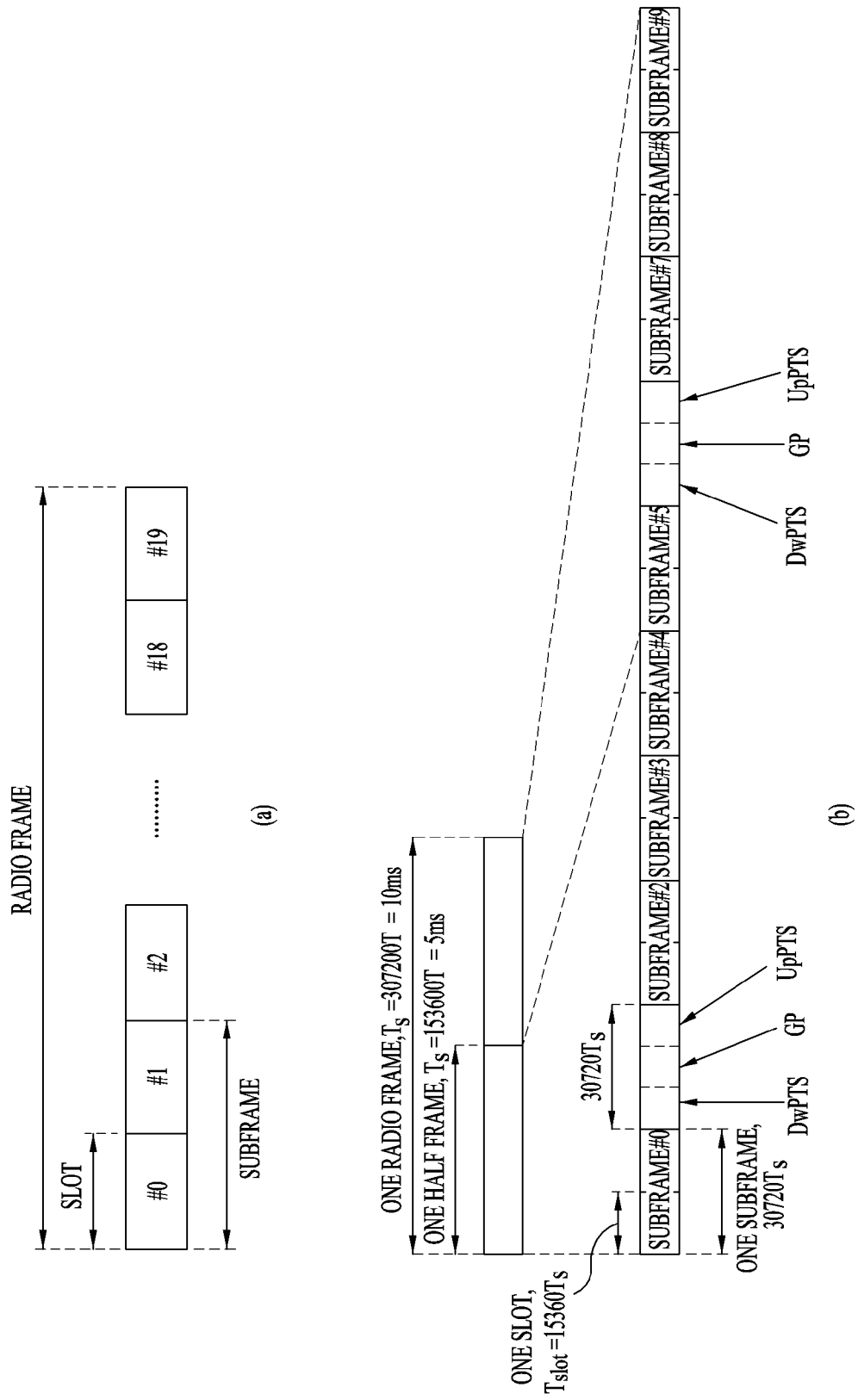
FIG. 1 illustrates a radio frame structure.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is given, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term "BS" may be replaced with the term "fixed station", "Node B", "evolved Node B (eNode B or eNB)", "Access Point (AP)", etc. The term "UE" may be replaced with the term "terminal", "Mobile Station (MS)", "Mobile Subscriber Station (MSS)", "Subscriber Station (SS)", etc.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems including Institute of Electrical and Electronics Engineers (IEEE) 802, 3GPP, 3GPP LTE, LTE-A, and 3GPP2. Steps or parts that are not described to clarify the technical features of the present invention can be supported by those documents. Further, all terms as set forth herein can be explained by the standard documents.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

FIG. 1 illustrates a radio frame structure.

In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 1(a) illustrates a type-1 radio frame structure. A downlink subframe includes 10 subframes, each of which includes 2 slots in the time domain. A unit time during which one subframe is transmitted is defined as a transmission time interval (TTI). For example, each subframe has a length of 1 ms and each slot has a length of 0.5 ms. A slot includes a plurality of orthogonal frequency division multiplexing (OFDM) symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first two or three OFDM symbols in each subframe can be allocated to a physical downlink control channel (PDCCH) and the remaining OFDM symbols can be allocated to a physical downlink shared channel (PDSCH).

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between UL and DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 2:
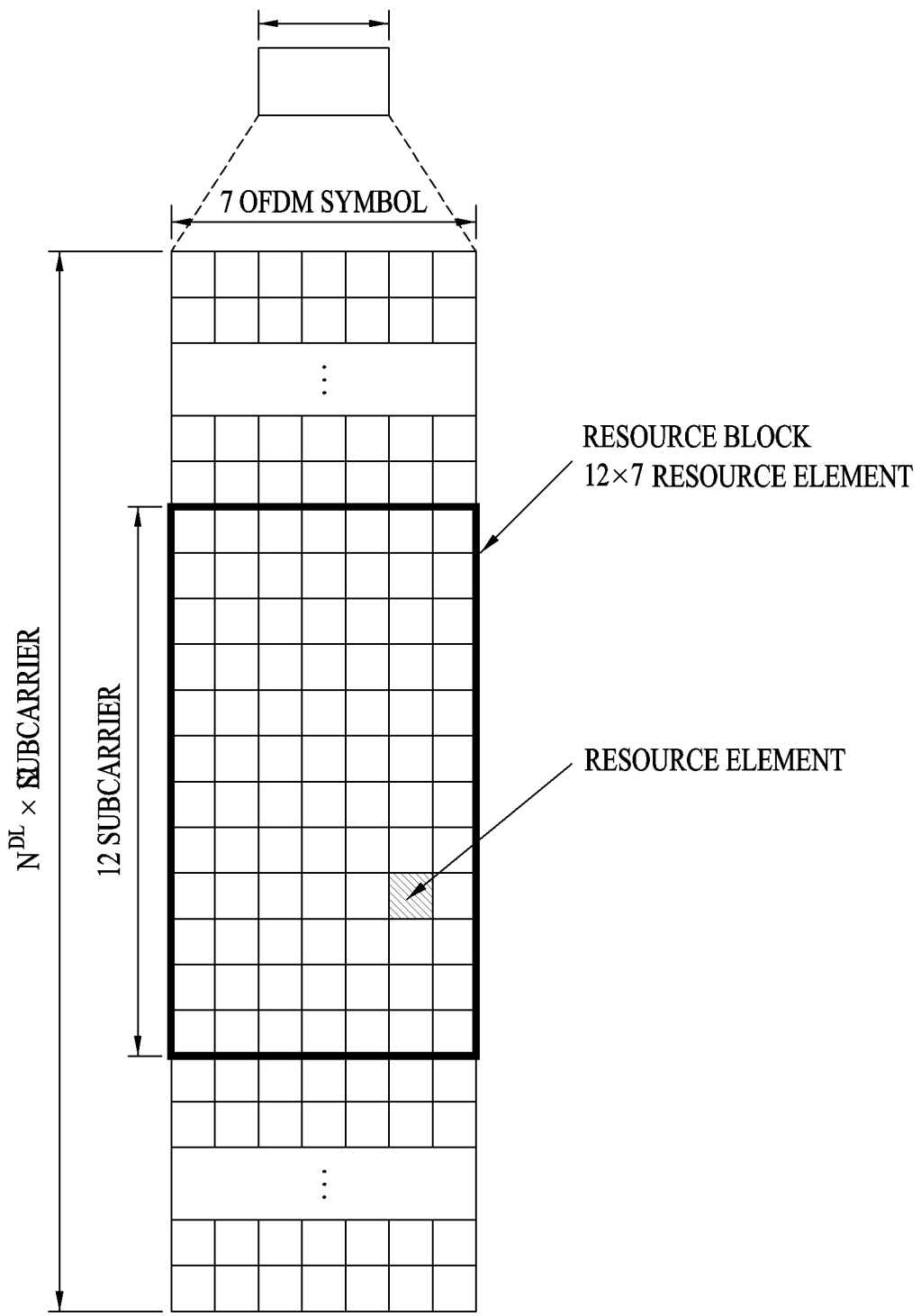
FIG. 2 illustrates a resource grid of a downlink slot.

FIG. 2 illustrates a resource grid in a downlink slot.

While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 3:
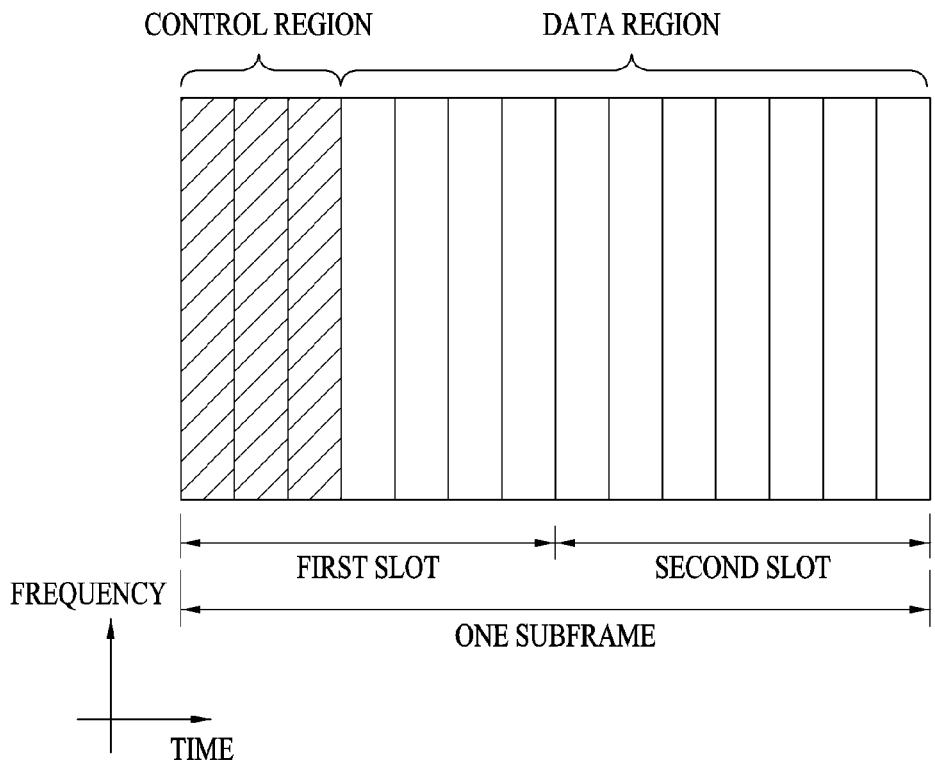
FIG. 3 illustrates a downlink subframe structure.

FIG. 3 illustrates a downlink subframe structure.

A maximum of three OFDM symbols located in a front portion of a first slot within a subframe correspond to a control region to which a control channel is allocated. The remaining OFDM symbols correspond to a data region to which a physical downlink shared chancel (PDSCH) is allocated.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response to uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by correlation between the number of CCEs and a coding rate provided by the CCEs.

The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
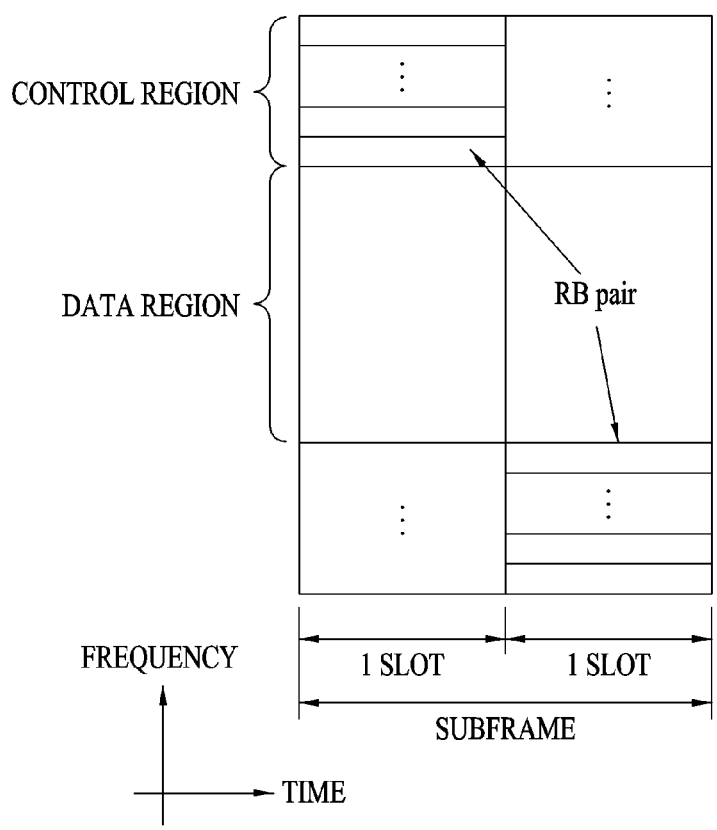
FIG. 4 illustrates an uplink subframe structure.

FIG. 4 illustrates an uplink subframe structure.

An uplink subframe may be divided into a control region and a data region in the frequency domain. The control region is allocated a physical uplink control channel (PUCCH) including uplink control information. The data region is allocated a physical uplink shared channel (PUSCH) including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

MIMO System Modeling

FIG. 5 illustrates configurations of wireless communication systems including multiple antennas.

As shown in FIG. 5(a), when the number of transmit (Tx) antennas increases to $N_T$, and at the same time the number of receive (Rx) antennas increases to $N_R$, a theoretical channel transmission capacity of the MIMO communication system increases in proportion to the number of antennas, differently from a case in which only a transmitter or receiver uses several antennas, so that transmission rate and frequency efficiency can be greatly increased. In this case, the transfer rate acquired by the increased channel transmission capacity can theoretically increase by a predetermined amount that corresponds to a product of a maximum transfer rate ($R_o$) acquired when one antenna is used and a rate of increase ($R_i$).

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been adopted in a variety of wireless communication standards, for example, third-generation mobile communication or next-generation wireless LAN, etc.

A variety of MIMO-associated technologies have been intensively researched, for example, research into information theory associated with MIMO communication capacity under various channel environments or multiple access environments, research into radio frequency (RF) channel measurement and modeling of the MIMO system, and research into space-time signal processing technology.

Mathematical modeling of a communication method for use in the above-mentioned MIMO system will hereinafter be described in detail. As can be seen from FIG. 10(a), it is assumed that there are $N_T$ Tx antennas and $N_R$ Rx antennas.

In the case of a transmission signal, a maximum number of transmission information pieces is $N_T$ under the condition that $N_T$ Tx antennas are used, so that the transmission information can be represented by a specific vector shown in the following equation.

$$s = [s_1, s_2, \ldots, s_{N_T}]^T \quad \text{[Equation 2]}$$

Individual transmission information pieces $s_1, s_1, \ldots, s_{N_T}$ may have different transmission powers. In this case, if the individual transmission powers are denoted by $P_1, P_2, \ldots, P_{N_T}$, then transmission information having an adjusted transmission power can be represented by a specific vector shown in the following equation.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

$\hat{S}$ can be represented by the following equation using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{S}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $W_{ij}$ denotes a weight corresponding to the i-th Tx antenna and j-th information. W represents a weight matrix or precoding matrix.

When $N_R$ Rx antennas are used, received signals $y_1, y_2, \ldots, y_{NR}$ of individual antennas can be represented by a specific vector (y) shown in the following equation.

$$y=[y_1, y_2, \ldots, y_{N_R}]^T \quad \text{[Equation 6]}$$

When channel modeling is executed in the MIMO communication system, individual channels can be distinguished from each other according to Tx/Rx antenna indexes. A specific channel passing the range from a Tx antenna j to an Rx antenna i is denoted by $h_{ij}$. In this case, it should be noted that the index order of the channel $h_{ij}$ is located before an Rx antenna index and is located after a Tx antenna index.

FIG. 5(b) shows channels from $N_T$ Tx antennas to an Rx antenna i. Several channels are tied up, so that they are displayed in the form of a vector or matrix. Referring to FIG. 5(b), the channels passing the range from the $N_T$ Tx antennas to the Rx antenna i can be represented by the following equation.

$$h_i^T = [h_{i1}, h_{i2}, \ldots, h_{iN_T}] \quad \text{[Equation 7]}$$

Accordingly all channels passing the range from the $N_T$ Tx antennas to $N_R$ Rx antennas can be represented by the following equation.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Additive white Gaussian noise (AWGN) is added to an actual channel which has passed the channel matrix H. The AWGN $n_1, n_2, \ldots, n_{NR}$ added to each of $N_R$ Rx antennas can be represented by a specific vector shown in the following equation.

$$n = [n_1, n_2, \ldots, n_{N_R}]^T \quad \text{[Equation 9]}$$

A reception signal calculated by the above-mentioned equations can be represented by the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

A matrix rank is defined by a smaller number between the number of rows and the number of columns, in which the rows and the columns are independent of each other. Therefore, the matrix rank cannot be higher than the number of rows or columns. The rank rank(H) of the channel matrix H can be represented by the following equation.

$$\text{rank}(H) \leq \min(N_T, N_R) \quad \text{[Equation 11]}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of information pieces that can be transmitted on a given channel.

In description of the specification, "rank" with respect to MIMO transmission refers to the number of paths through which signals can be independently transmitted in a specific frequency resource at a specific time, and "the number of layers" refers to the number of signal streams transmitted through each path. Since a transmitter generally transmits as many layers as the number of ranks used for signal transmission, "rank" has the same meaning as "number of layers" unless otherwise mentioned.

As described above, when the transmitter loads data in Ns data streams (or layers) and simultaneously transmits the data streams, a receiver can decompose received signals into Nx data streams (or layers) and simultaneously receive the data streams. Specifically, when the transmitter precodes the Ns data streams s into a signal x transmitted through a Tx antenna and transmits the signal x, a MIMO receiver can perform a decoding process for decomposing a signal y received through a channel H into Nx received data streams. That is, a MIMO precoder function is important for the transmitter and an MIMO decoder function is important for the receiver.

While description of the example of FIG. 5 is based on the narrow-band system, description of the MIMO system can be easily extended to a wideband system. For example, a transmitter performs OFDM modulation and a receiver performs OFDM demodulation in an OFDM system, and thus one wideband system can be modeled as a set of a plurality of narrow-band systems corresponding to a plurality of subcarriers. One narrow-band system can be modeled as the MIMO system as shown in FIG. 5. Even though the following description is based on modeling of one narrow-band system for clarity, the description can be directly extended and applied to operations in wideband systems.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

Reference signals (RSs) can be classified into two types according to purpose in a mobile communication system. One is an RS used for channel information acquisition and the other is an RS used for data demodulation. The former needs to be transmitted in wide band since the RS is used for a UE to acquire downlink channel information. Even a UE that does not receive downlink data in a specific subframe needs to receive and measure the RS for channel information acquisition. This RS is also used for measurement such as handover measurement. The latter is an RS transmitted along with a corresponding resource when a BS performs downlink transmission. A UE can perform channel estimation by receiving the RS and thus can demodulate data. This RS needs to be transmitted in a region in which data is transmitted.

3GPP LTE (e.g. 3GPP LTE release-8) defines two types of downlink RSs for unicast service: a common RS (CRS) and a dedicated RS (DRS). The CRS is used for acquisition of information about a channel state and measurement for handover and may be called a cell-specific RS. The DRS is used for data demodulation and may be called a UE-specific RS. In 3GPP LTE, the DRS is used for data demodulation only and the CRS can be used for both channel information acquisition and data demodulation.

The CRS is transmitted cell-specifically. The CRS is transmitted per subframe in wideband. The CRS can be transmitted for a maximum of four antenna ports according to the number of Tx antennas of a BS. For example, when the number of Tx antennas of the BS is 2, CRSs with respect to antenna ports #0 and #1 are transmitted. When the number of Tx antennas of the BS is 4, CRSs with respect to antenna ports #0, #1, #2 and #3 are transmitted.

Figure 6:
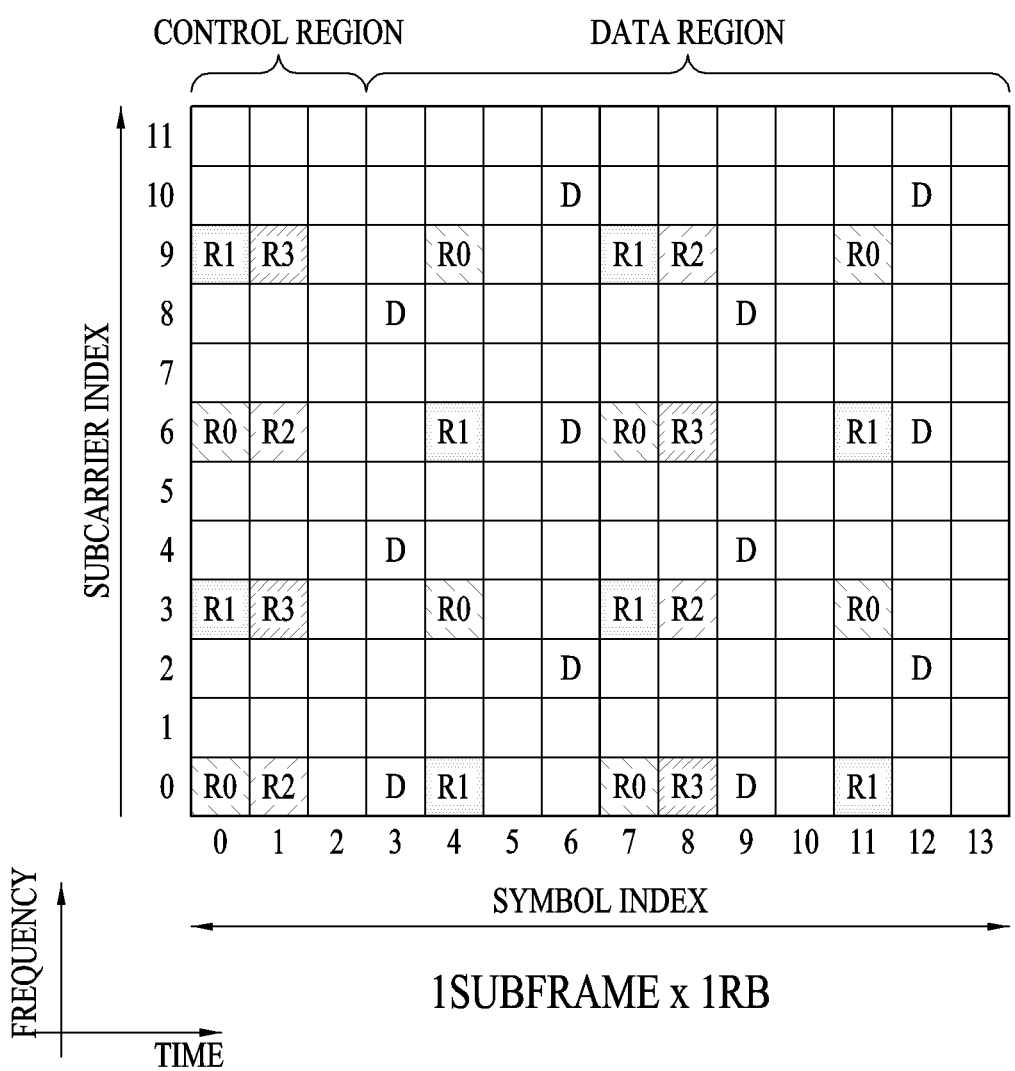
FIG. 6 illustrates exemplary CRS and DRS patterns in one resource block pair.

FIG. 6 illustrates exemplary CRS and DRS patterns in one resource block pair.

FIG. 6 shows CRS and DRS patterns in one resource block pair (14 OFDM symbols in the time domain×12 subcarriers in the frequency domain in the case of normal CP) in a system in which a base station supports 4 Tx antennas. In FIG. 6, REs indicated by "R0", "R1", "R2" and "R3" respectively represent CRS positions with respect to antenna port indices 0, 1, 2 and 3. An RE indicated by "D" represents the position of a DRS defined in LTE.

In LTE-A evolving from LTE, a maximum of 8 Tx antennas can be supported on downlink. Accordingly, reference signals for a maximum of 8 Tx antennas need to be supported. Since only downlink reference signals for a maximum of 4 antenna ports are defined in LTE, reference signals for added antenna ports need to be additionally defined and designed when a BS has 4 to 8 downlink Tx antennas in an LTE-A system. Both the channel measurement reference signal and data demodulation reference signal need to be employed as reference signals for a maximum of 8 Tx antenna ports.

One important consideration in design of an LTE-A system is backward compatibility. That is, LTE UEs need to operate in LTE-A systems and the LTE-A system needs to support the same. In reference signal transmission, reference signals for a maximum of 8 Tx antenna ports need to be additionally defined in a time-frequency region in which a CRS defined in LTE is transmitted per subframe in the entire bandwidth. In LTE-A, however, when a reference signal pattern for a maximum of 8 transmit antennas is added per subframe to the entire bandwidth as in LTE, reference signal transmission overhead excessively increases.

Reference signals newly designed in LTE-A are categorized into a channel state information reference signal (CSI-RS) (or channel state information-RS) for channel measurement for selecting a modulation and coding scheme (MCS) and a precoding matrix index (PMI) and a demodulation RS (DMRS) for demodulation of data transmitted through 8 transmit antennas.

The CSI-RS is designed for the purpose of channel measurement, whereas the CRS is used for measurement, such as channel measurement and handover measurement, and data demodulation in LTE. The CSI-RS may also be used for handover measurement. The CSI-RS need not be transmitted per subframe since the CSI-RS is used to obtain channel state information, differently from the CRS in LTE. Accordingly, the CSI-RS can be designed such that the CSI-RS is intermittently (e.g. periodically) transmitted in the time domain to reduce CSI-RS transmission overhead.

If data is transmitted in a downlink subframe, a DMRS dedicated to a UE scheduled to transmit data is transmitted to the UE. That is, the DMRS may be called a UE-specific RS. A DMRS dedicated to a specific UE can be designed such that the DMRS is transmitted only in a resource region for which the UE is scheduled, that is, a time-frequency domain in which data with respect to the UE is transmitted.

Figure 7:
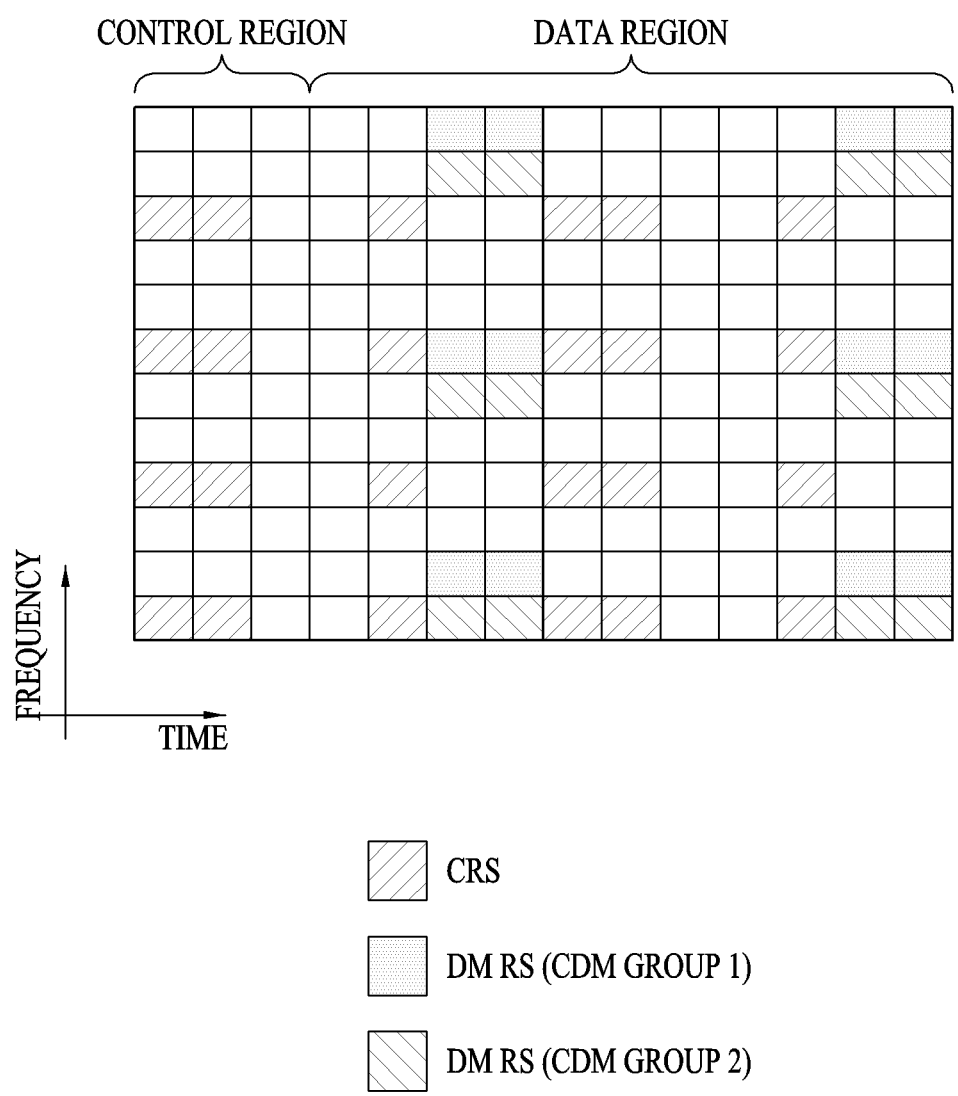
FIG. 7 illustrates an exemplary DMRS pattern defined in LTE-A.

FIG. 7 illustrates an exemplary DMRS pattern defined in LTE-A.

FIG. 7 shows the position of an RE through which a DMRS is transmitted on one RB pair (14 OFDM symbols in the time domain×12 subcarriers in the frequency domain in the case of normal CP) through which downlink data is transmitted. DMRSs can be transmitted for 4 antenna ports (antenna port indices 7, 8, 9 and 10) additionally defined in LTE-A. DMRSs with respect to different antenna ports can be identified by being located in different frequency resources (subcarriers) and/or different time resources (OFDM symbols) (i.e. multiplexed according to FDM and/or TDM). In addition, DMRSs with respect to different antenna ports, which are located in the same time-frequency resource, can be identified using an orthogonal code (i.e. multiplexed according to CDM). In the example of FIG. 7, DMRSs with respect to antenna ports 7 and 8 may be located in REs corresponding to DMRS CDM group 1 and multiplexed according to an orthogonal code. Similarly, DMRSs with respect to antenna ports 9 and 10 may be located in REs corresponding to DMRS CDM group 2 and multiplexed according to an orthogonal code.

When a BS transmits a DMRS, the same precoding as precoding applied to data is applied to the DMRS. Accordingly, channel information estimated by a UE using the DMRS (or UE-specific RS) is precoded channel information. The UE can easily perform data demodulation using the precoded channel information estimated through the DMRS. However, the UE cannot acquire unprecoded channel information from the DMRS since the UE cannot be aware of precoding information applied to the DMRS. The UE can acquire unprecoded channel information using a reference signal other than the DMRS, that is, the aforementioned CSI-RS.

Figure 8:
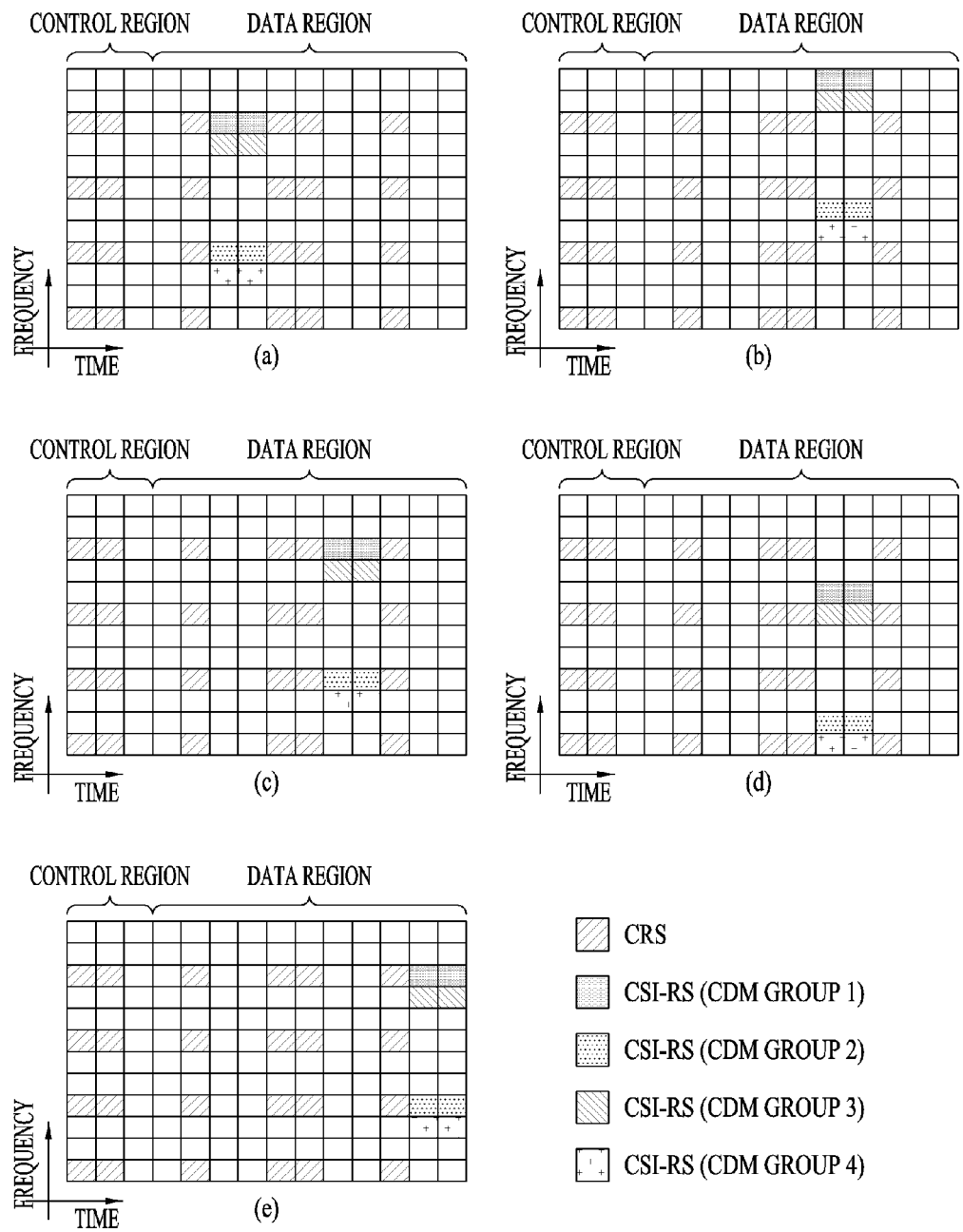
FIG. 8 illustrates exemplary CSI-RS patterns defined in LTE-A.

FIG. 8 illustrates exemplary CSI-RS patterns defined in LTE-A.

FIG. 8 shows positions of REs on which CSI-RSs are transmitted on one RB pair (14 OFDM symbols in the time domain×12 subcarriers in the frequency domain in the case of normal CP) through which downlink data is transmitted. One of CSI-RS patterns of FIGS. 8(a) to 8(e) can be used in a downlink subframe. CSI-RSs can be transmitted for 8 antenna ports (antenna port indices 15 to 22) additionally defined in LTE-A. CSI-RSs with respect to different antenna ports can be identified by being located in different frequency resources (subcarriers) and/or different time resources (OFDM symbols) (that is, multiplexed according to FDM and/or TDM). In addition, CSI-RSs with respect to different antenna ports, which are located in the same time-frequency resource, can be identified using an orthogonal code (i.e. multiplexed according to CDM). In FIG. 8(a), CSI-RSs with respect to antenna ports #15 and #16 can be located in REs represented as CSI-RS CDM group 1 and can be multiplexed using an orthogonal code. In addition, CSI-RSs with respect to antenna ports #17 and #18 can be located in REs represented as CSI-RS CDM group 2 and can be multiplexed using an orthogonal code. CSI-RSs with respect to antenna ports #19 and #20 can be located in REs represented as CSI-RS CDM group 3 and can be multiplexed using an orthogonal code. CSI-RSs with respect to antenna ports #21 and #22 can be located in REs represented as CSI-RS CDM group 4 and can be multiplexed using an orthogonal code. The principle described with reference to FIG. 8(a) can be equally applied to FIGS. 8(b) to 8(e).

RS patterns shown in FIGS. 6, 7 and 8 are exemplary and various embodiments of the present invention are not limited to specific RS patterns. That is, various embodiments of the present invention can be equally applied to a case in which an RS pattern different from those of FIGS. 6, 7 and 8 is defined and used.

Channel State Information (CSI)

MIMO may be classified into open loop and closed loop schemes. Open loop MIMO refers to MIMO transmission performed by a transmitter without CSI feedback of a MIMO receiver. Closed loop MIMO refers to a scheme by which the transmitter receives CSI feedback from the MIMO receiver and performs MIMO transmission. According to closed loop MIMO, the transmitter and receiver can perform beamforming based on CSI to obtain a multiplexing gain of MIMO Tx antennas. The transmitter (e.g. BS) may allocate a UL control channel or UL shared channel to the receiver (e.g. UE) such that the receiver (e.g. UE) can feed back CSI.

A UE can perform downlink channel estimation and/or measurement using a CRS and/or a CSI-RS. Channel state information (CSI) fed back by the UE to a BS may include a rank indicator (RI), a precoding matrix index (PMI) and a channel quality indicator (CQI).

The RI is information regarding a channel rank which indicates the number of layers (or streams) capable of transmitting different pieces of information through the same time-frequency resource. Since a rank value is determined according to long term fading of a channel, RI can be fed back in a long period (i.e. less frequently) compared to the PMI and CQI.

The PMI is information regarding a precoding matrix used for data transmission of a transmitter and reflecting spatial characteristics of a channel. Precoding refers to mapping of a transport layer to a Tx antenna and layer-antenna mapping relationship may be determined by a precoding matrix. PMI corresponds to a precoding matrix index of a preferred BS of a UE on the basis of metrics such as a signal-to-interference plus noise ratio (SINR). To reduce precoding information feedback overhead, the transmitter and receiver may share a codebook including various precoding matrices and only an index indicating a specific precoding matrix in the codebook may be fed back. For example, the PMI can be determined on the basis of a most recently reported RI.

The CQI is information regarding channel quality or channel intensity. The CQI may be represented by a predetermined MCS combination. That is, a fed back CQI index represents a corresponding modulation scheme and code rate. The CQI can be calculated by setting a specific resource region (e.g. a region specified by valid subframes and/or physical resource blocks) as a CQI reference resource and assuming that PDSCH transmission is present in the CQI reference resource and a PDSCH can be received without exceeding a predetermined error probability (e.g. 0.1). In general, the CQI is a value reflecting reception SINR that can be obtained when a BS configures a spatial channel using the PMI.

A system (e.g. LTE-A) supporting extended antenna configurations considers acquisition of additional multi-user diversity using multi-user MIMO (MU-MIMO). In MU-MIMO, an interference channel is present between UEs multiplexed in an antenna domain, and thus it is necessary to prevent generation of interference in a UE when a BS performs DL transmission using CSI fed back from another UE from among multiple users. Accordingly, for correct MU-MIMO operation, CSI with higher accuracy needs to be fed back as compared to single user MIMO (SU-MIMO).

For more accurate CSI measurement and reporting, a method of feeding back new CSI obtained by improving the conventional CSI including RI, PMI and CQI may be applied. For example, precoding information fed back by a receiver can be indicated by a combination of two PMIs (e.g. i1 and i2). Accordingly, a more accurate PMI can be fed back and a more accurate CQI can be calculated and reported on the basis of the accurate PMI.

CSI may be periodically transmitted through a PUCCH or aperiodically transmitted through a PUSCH. In addition, various reporting modes can be defined according to which one of an RI, a first PMI (e.g. W1), a second PMI (e.g. W2) and a CQI is fed back and whether a fed back PMI and/or CQI are for wideband (WB) or subband (SB).

Deployment of Multiple Antennas

A beam generated by a conventional one-dimensional antenna configuration is specified only in the azimuth angle (e.g. horizontal domain) direction and cannot be specified in the elevation angle (e.g. vertical domain) direction, and thus only 2-dimensional beamforming is supported therefor. The one-dimensional antenna configuration (e.g. uniform linear array (ULA)) can support adaptive beamforming or spatial multiplexing in the azimuth angle direction, and only MIMO transmission and reception schemes for adaptive beamforming or spatial multiplexing are designed in conventional wireless communication systems (e.g. systems conforming to 3GPP LTE release-8, 9, 10 and 11).

When MIMO transmission and reception schemes based on a 2-dimensional antenna configuration (e.g. uniform rectangular array (URA)) for system performance improvement are supported, a beam generated by the 2-dimensional antenna configuration can be specified in the azimuth angle direction and the elevation angle direction and thus 3-dimensional beamforming can be performed therefor.

FIG. 9 illustrates examples of beamforming according to a 2-dimensional antenna configuration.

FIG. 9(a) shows examples of sector-specific beamforming, generated by limiting a predetermined range of the azimuth angle and a predetermined range of the elevation angle. FIG. 9(b) shows examples of UE-specific beamforming, generated by varying the elevation angle at the same azimuth angle.

According to the aforementioned function of generating a beam by specifying the azimuth angle and elevation angle, it is possible to support new beamforming such as sector-specific elevation beamforming (e.g. adaptive control according to a vertical pattern beamwidth and/or downtilt), improved sectorization in the vertical domain and user (or UE)-specific elevation beamforming Vertical sectorization can improve average system performance through a gain of a vertical sector pattern. UE-specific elevation beamforming can increase SINR with respect to a UE by designating a vertical antenna pattern in the direction of the UE.

Antenna Virtualization

A transmission antenna and/or a reception antenna, defined to describe operations of a communication system, may be referred to as a virtual antenna or an antenna port. The virtual antenna may or may not be one-to-one mapped to a physical antenna of a transmitter and/or a physical antenna or a receiver.

FIG. 10 illustrates antenna virtualization.

When the number of transmission virtual antennas (or transmission antenna ports) is $N_{tx}^V$ and the number of transmission physical antennas is $N_{tx}^P$, some physical antennas can be grouped to transmit the same signal all the time if $N_{tx}^P > N_{tx}^V$. Here, since grouped antennas operate as if the antennas are a single antenna, the grouped antennas can be considered to form one virtual antenna. This can be referred to as transmission antenna virtualization.

When the number of reception virtual antennas (or reception antenna ports) is $N_{rx}^V$, the number of reception physical antennas is $N_{rx}^P$ and $N_{rx}^P > N_{rx}^V$, the sum of received signals at some grouped physical antennas can be mapped to the input of a MIMO decoder. In this case, the grouped antennas can operate as if the antennas are a single antenna. This can be referred to as reception antenna virtualization.

Since transmission antenna virtualization and reception antenna virtualization are independent technologies, only one thereof may be applied and different antenna virtualization schemes may be used according to signals even in one system. For example, different antenna virtualization schemes can be respectively applied to transmission of a CSI-RS and a CRS defined in LTE Rel-10 (or LTE-A). LTE Rel-10 supports a maximum of 8 CRS-RS antenna ports (i.e. 8 virtual antennas) and a maximum of 4 CRS antenna ports (or 4 virtual antennas). This means that one system supports up to 8 virtual antennas for a specific pilot (RS) and supports up to 4 virtual antennas for a different type of pilot. Consequently, different antenna virtualization schemes can be applied according to signal type even in the same system. If 16 transmission physical antennas are present, then every two antennas can be grouped to form 8 virtual antennas for CSI-RS transmission or every four antennas can be grouped to form 4 virtual antennas for CRS transmission.

As described above, antenna virtualization is a technology for mapping a physical antenna to a virtual antenna (or antenna port). Since a virtual antenna-to-physical antenna mapping scheme may depend on a device implementation method, communication standards for defining operations of communication systems define only communication schemes based on the virtual transmission antenna and virtual reception antenna.

In addition, the purpose of antenna virtualization is to change a channel between a virtual transmission antenna and a virtual reception antenna to a channel more advantageous for communication. The channel between the virtual transmission antenna and the virtual reception antenna is defined as an effective channel Ĥ.

Channel Aging

There is a time difference between a time when a UE measures CSI (e.g. an RI, a PMI, a CQI and the like) on a downlink channel and a time when an eNB that has been notified by the UE of the CSI transmits data through the downlink channel. When a channel severely changes with time, the CSI reported to the eNB by the UE may not correctly reflect a channel state at the data transmission time. This phenomenon is called channel aging. Channel aging may cause performance deterioration. Further, channel aging is closely related to temporal variation of the channel, and thus performance deterioration due to channel aging is aggravated as a UE moving speed increases. In addition, since a channel state that a moving UE undergoes may abruptly change as beamforming resolution increases according to 2-dimensional antenna configuration, and thus performance deterioration due to channel aging becomes serious.

UE State Adapted Antenna Virtualization Scheme

Communication performance using a plurality of physical antennas can be optimized by applying transmission antenna or reception antenna virtualization. Here, an optimized antenna virtualization method for a UE may be changed according to change of a factor such as time, space or the like. Accordingly, there is a need for a method for adaptively (or flexibly) applying antenna virtualization according to a movement state and/or a communication state of a UE.

The present invention provides a method for adaptively applying an antenna virtualization pattern according to a movement state and/or a communication state of a UE. Here, information indicating the movement state of the UE may include parameters with respect to whether the UE moves, moving direction, moving speed, acceleration/deceleration state and the like. In addition, information indicating the communication state may include parameters with respect to a distance between the UE and a device (e.g. eNB) that transmits/receives signals to/from the UE, relative positions, channel state (e.g. CSI) and the like. Further, information related to the adaptive antenna virtualization pattern may include the number of transmission virtual antennas, the number of reception virtual antennas, the number of physical antennas included in a single virtual antenna, information on a physical antenna mapped to a virtual antenna (i.e. information indicating/specifying one or more physical antennas (e.g. physical antenna index information)) and the like, and the antenna virtualization pattern may be defined by one or more pieces of the information.

FIG. 11 illustrates a UE state adapted antenna virtualization method according to an embodiment of the present invention.

In the embodiment shown in FIG. 11, it is assumed that 6 physical antennas are provided for one UE.

As a simple example of determining an antenna virtualization pattern adapted to a UE state, antenna virtualization may be performed in such a manner that channel state variation (or beam pattern variation) according to movement of the UE is minimized. For example, transmission/reception antenna virtualization can be performed in the main moving direction of the UE.

As shown in FIG. 11, antenna virtualization can be performed such that an antenna pattern having a wide beamwidth in the moving direction of the UE is formed. In other words, the antenna virtualization pattern is determined such that the beamwidth is extended in the same direction as the moving direction of the UE. Otherwise, the antenna virtualization pattern is determined in such a manner that physical antennas aligned in the main moving direction of the UE (or arranged most closely to the main moving direction of the UE) are grouped. For example, in transmission antenna virtualization of the UE, inconsistency of channel states according to transmission antennas of the UE during handover can be reduced by widening the beamwidth from the virtual antenna of the UE. In reception antenna virtualization of the UE, inconsistency of channel states that the UE suffers at different positions when in motion can be reduced when the UE receives a beam transmitted from a specific point (e.g. eNB).

The UE illustrated in FIG. 11 may be a vehicle, for example, and the physical antennas may be arranged outside the vehicle. If the vehicle moves in the horizontal direction in the figure, antennas present in a traverse direction from the front to the back of the vehicle can be grouped to configure one virtual antenna. For example, as shown in FIG. 11(a), physical antennas $a_0$, $a_1$, $a_2$, $a_3$, $a_4$ and $a_5$ can be grouped to configure one virtual antenna #0. When the virtual antenna is configured in this manner, antenna virtualization is performed such that a wide beamwidth is obtained in the moving direction of the vehicle and thus channel state inconsistency that the moving vehicle suffers can be reduced and antenna gain can increase.

Here, a large number of physical antennas included in one virtual antenna (or mapped to one virtual antenna) does not always secure high performance. For example, when channel aging is not serious such as a case in which the UE moves at a low speed, higher performance may be achieved when the number of physical antennas included in one virtual antenna is not large. When a large number of physical antennas configure one transmission virtual antennas, for example, performance deterioration may occur due to dispersion of transmission power. Further, when a large number of physical antennas configure one reception virtual antennas, performance deterioration may occur due to dispersion of antenna gain. Accordingly, it is necessary to appropriately control the number of physical antennas mapped a virtual antenna for transmission power concentration or antenna gain concentration.

When the moving speed of the UE is high (or when the UE moves at higher than a predetermined threshold speed), the number of physical antennas included in one virtual antenna can be increased, as shown in FIG. 11(a), such that a virtual antenna pattern robust to channel aging is formed. That is, six physical antennas $a_0$, $a_1$, $a_2$, $a_3$, $a_4$ and $a_5$ can be mapped to one virtual antenna #0.

When the moving speed of the UE is low (or when the UE moves at lower than the predetermined threshold speed), the influence of channel aging is not severe and thus the number of physical antennas included in one virtual antenna can be reduced (i.e. the number of virtual antennas can be increased), as shown in FIG. 11(b), in order to improve transmission power efficiency/antenna gain. In the example of FIG. 11(b), three physical antennas $a_0$, $a_1$ and $a_2$ can be mapped to virtual antenna #0 and three other physical antennas $a_3$, $a_4$ and $a_5$ can be mapped to virtual antenna #1. When the number of virtual antennas increases in this manner, a maximum number of transport streams (or ranks) can be increased in a MIMO system.

As described in the examples of FIGS. 11(a) and 11(b), the number of physical antennas included in one virtual antenna can be proportional to the moving speed of the UE. According to the present embodiment, it is possible to adaptively apply antenna virtualization to maximize spatial multiplexing gain of MIMO when the UE moves at a low speed (i.e. support a high transmission rank), minimize channel aging effects when the UE moves at a high speed and maximize MIMO beam gain (i.e. increase signal-to-noise ratio (SNR) gain).

A description will be given of an antenna virtualization method considering communication state. The method for grouping physical antennas aligned in the moving direction of the vehicle (i.e. arranged in the traverse direction from the front to the back of the vehicle) to configure a virtual antenna, as shown in FIG. 11, can achieve higher performance when a device that transmits/receives signals to/from the vehicle is located in a direction perpendicular to the moving direction of the vehicle (e.g. when en eNB, roadside AP or the like is located higher than or far from the vehicle). When the device that transmits/receives signals to/from the vehicle is located in the same direction as the moving direction of the vehicle (e.g. when a plurality of devices is located at the center of a road at a level similar to that of the vehicle), a virtual antenna in a form different from the virtual antenna including physical antennas aligned in the moving direction of the vehicle may be configured or the number of physical antennas included in one virtual antenna may be controlled.

Antenna Information Reconfiguration Scheme

To adaptively apply an antenna virtualization pattern of a UE according to a state of the UE (e.g. movement state and/or communication state), as described above, a procedure for reconfiguring antenna information between the UE and an eNB is needed.

In LTE, antenna information of the UE can be transmitted to the eNB or a network through a UE capability update procedure. The UE capability update procedure may include transmission of a UE-EUTRA-capability information element (IE) from the UE to the network through radio resource control (RRC) signaling (refer to 3GPP TS 36.331). Here, UE-EUTRA-capability IE can include E-UTRA UE radio access capability parameters, and the parameters can include parameters related to the antenna information of the UE (refer to 3GPP TS 36.306). For example, the antenna information of the UE can be included in a field such as a maximum transport rank supported by the UE (or a maximum number of supported layers for spatial multiplexing in DL) parameter.

UE capability information can be provided to the network when the UE initially accesses the network and provided to the network through a tracking area update procedure (TAU) in other cases. A TA is a unit including one or more cells or eNBs and corresponds to a range larger than a cell. When a TA in which the UE is located is changed, the UE needs to report a new TA to the network node and thus the network node updates the location of the UE. This procedure is called a TAU procedure. Upon successful TAU, when data to be transmitted to the UE is generated, the network node can notify the UE of presence of the data to be received by the UE by transmitting a paging message to all eNBs belonging to a TA which is most recently reported by the UE. Further, a lot of information in addition to the UE capability information is exchanged between the UE and the network node through the TAU procedure (refer to 3GPP TS 23.401).

As described above, the antenna information of the UE can be changed only when the UE initially accesses the network or TAU is performed. TAU is initiated when the UE transmits a TAU request upon detection of entry to a TA that is not included in a TA list of the UE, initiated when the network permits TAU or periodically performed by the UE in order to notify the network of availability thereof. Since a TAU period is considerably long, it is difficult to dynamically change the antenna information of the UE.

To change the antenna information of the UE, the UE capability information (e.g. UE-EUTRA-Capability IE) is used. The quantity of UE capability information is very large (e.g. 50 to 150 octets) since the UE capability information includes a lot of information related to a network access function as well as the antenna information of the UE.

As described above, since the conventional UE capability update procedure requires a long update time and a large quantity of resources (i.e. signaling overhead), it is difficult to adaptively apply/change an antenna virtualization pattern according to a UE state using the conventional UE capability update procedure. Accordingly, there is a need for a new signaling method for supporting UE state adapted antenna virtualization.

A new signaling operation provided by the present invention can be performed not only during initial access of a UE but also in other situations and may be carried out at an interval shorter than a TAU execution interval. In addition, the new signaling operation provided by the present invention can be performed to change an antenna virtualization pattern of the UE (or reconfigure antennas) even when an event such as TAU is not generated.

FIG. 12 is a flowchart illustrating an antenna reconfiguration method according to an embodiment of the present invention.

A UE can request antenna information reconfiguration to an eNB in step S1210. Here, antenna information reconfiguration request may not include substantial antenna information and may be understood as a procedure of inquiring about whether antenna information reconfiguration is permitted. For example, antenna information reconfiguration can be requested by transmitting information indicating an antenna information reconfiguration request through higher layer (e.g. RRC) signaling. Alternatively, antenna information reconfiguration can be requested through physical layer signaling using an existing physical channel (e.g. PUCCH or PUSCH) and information indicating antenna information reconfiguration request, which can be transmitted through an existing physical channel, can be defined and used. In addition, a new physical channel for antenna information reconfiguration request can be defined and used.

The eNB can authorize the antenna information reconfiguration request of the UE in step S1220. Otherwise, the eNB may reject the antenna information reconfiguration request of the UE. For example, the eNB can authorize or reject the antenna information reconfiguration request of the UE in consideration of resource allocation state of the UE, the influence on other UEs and the like. To notify the UE of authorization/rejection, the eNB may transmit information indicating authorization/rejection to the UE through higher layer (e.g. RRC) signaling. Alternatively, the UE may be notified of authorization/rejection of the eNB through physical layer signaling using an existing physical channel (e.g. PDCCH or PDSCH), and information indicating authorization/rejection, which can be transmitted through an existing physical channel, may be defined and used. In addition, a new physical channel for indicating authorization/rejection of the eNB can be defined and used. FIG. 12 illustrates a case in which the eNB authorizes antenna information reconfiguration of the UE. In this case, the procedure can proceed to step S1230. When the eNB rejects antenna information reconfiguration of the UE, the procedure can be ended in step S1220.

The UE can transmit antenna reconfiguration information to the eNB in step S1230. The antenna reconfiguration information of the UE may include at least one of the number of physical transmission antennas of the UE, the number of physical reception antennas of the UE, the number of transmission antenna ports (virtual antennas) of the UE, the number of reception antenna ports (virtual antennas) of the UE, information about mapping between virtual antennas and physical antennas, a maximum number of uplink transport streams (i.e. maximum uplink rank), a maximum number of downlink transport streams (i.e. maximum downlink rank), antenna gain and antenna characteristics. The antenna characteristics may include information about cross-polarization or polarization of an antenna such as ULA, antenna arrangement (one-dimensional or two-dimensional URA) and the like. When an antenna virtualization pattern is applied differently even for one UE, as shown in FIG. 11, antenna gains and/or antenna characteristics of corresponding virtual antennas can be varied. Accordingly, information about an appropriate antenna gain and/or antenna characteristics with respect to an antenna virtualization pattern to be applied needs to be included in the antenna reconfiguration information of the UE.

Further, the antenna reconfiguration information may correspond to preferred antenna reconfiguration information of the UE.

The antenna reconfiguration information can be transmitted through higher layer (e.g. RRC) signaling in step S1230. Otherwise, the antenna reconfiguration information can be transmitted through physical layer signaling using an existing physical channel (e.g. PUCCH or PUSCH). Further, a new physical channel for transmitting the antenna reconfiguration information may be defined and used.

The eNB can confirm the antenna reconfiguration information received from the UE and notify the UE of completion of antenna reconfiguration according to a changed antenna virtualization pattern in step S1240. Reconfiguration completion acknowledgement information may be transmitted through higher layer (e.g. RRC) signaling or through physical layer signaling using an existing physical channel (e.g. PDCCH or PDSCH). A new physical channel may be defined and used to transmit the reconfiguration completion acknowledgement information.

The reconfiguration completion acknowledgement information may be information indicating that the preferred antenna reconfiguration information of the UE is used or may include antenna reconfiguration information recommended by the eNB on the basis of the preferred antenna reconfiguration information of the UE.

FIG. 12 is a flowchart illustrating an antenna reconfiguration method according to another embodiment of the present invention.

The example of FIG. 13 omits the authorization step of the eNB in the four-step antenna reconfiguration method illustrated in FIG. 12 and shows a 2-step antenna reconfiguration method.

The UE can transmit antenna reconfiguration information according to an antenna virtualization pattern to be applied to the eNB while requesting that the eNB perform antenna information reconfiguration in step S1310. The eNB can notify the UE whether antenna reconfiguration is authorized or rejected in step S1320. The signaling methods of steps S1230 and S1240 can be applied when the eNB signals reconfiguration authorization/rejection and reconfiguration completion to the UE, and thus redundant description is omitted.

In the example of FIG. 12 or FIG. 13, the UE can set one or more virtual antennas by applying an antenna virtualization pattern according to the antenna reconfiguration information authorized/confirmed by the eNB, upon reception of authorization and/or reconfiguration completion acknowledgement information in response to the antenna information reconfiguration request, and communicate with the eNB using the one or more virtual antennas.

According to the antenna information reconfiguration methods of the present invention, described with reference to FIGS. 12 and 13, only antenna information of the UE is updated, distinguished from the conventional method for updating the whole UE capability information through the TAU procedure. Accordingly, the antenna reconfiguration methods provided by the present invention have very low signaling overhead, compared to conventional UE capability information update, and can update the antenna information of the UE dynamically or at a very short interval.

In addition, the number of possible antenna virtualization patterns (e.g. the number of configured transmission virtual antennas, the number of configured reception virtual antennas, the number of physical antennas that constitute one virtual antenna, which physical antenna is mapped to one virtual antenna (i.e. information indicating/specifying one or more physical antennas) and the like) can considerably increase according to the number of physical antennas of the UE and arrangement of the physical antennas. Accordingly, definition of control information capable of indicating a lot of cases remarkably increases overhead of control information exchanged between the UE and the eNB, which is inefficient. Therefore, the present invention defines control information about an antenna virtualization pattern in the form of information that directly or indirectly indicates a specific antenna virtualization pattern from among antenna virtualization pattern candidates predetermined between the eNB and the UE.

For example, when the UE negotiates UE capability during initial network access, the UE can pre-define/negotiate information about some candidates of antenna configuration. These candidates of antenna configuration are mapped to information indicating movement states and/or communication states of the UE and may be determined between the eNB and the UE. Accordingly, when a movement state and/or a communication state of the UE satisfy a predetermined condition, antenna configuration mapped to the corresponding condition can be applied without additional request and acknowledgement processes between the UE and the eNB. Alternatively, application of a specific candidate may be determined from among the candidates of antenna configuration through agreement between the UE and the eNB at the request of the UE or the eNB.

Furthermore, in adaptive application of antenna virtualization, change of antenna characteristics (e.g. antenna virtualization pattern) during data transmission and reception between the UE and the eNB may affect transmission and reception performance. Accordingly, virtual antenna configuration may be limited such that the virtual antenna configuration is changed only when the UE does not perform data transmission and reception (e.g. when the UE is idle or turns off a communication function).

The number of virtual antennas determined according to adaptive antenna virtualization provided by the present invention (or changed from a previous number of virtual antennas) may affect the number of transmitted pilot signals, the number of received pilot signals and/or channel state information (CSI) feedback information calculation and configuration.

In application of the embodiments of the present invention, the embodiments are not limited such that a transmission antenna virtualization method and a reception antenna virtualization method are identical. For example, some of a plurality of antennas can be transmission dedicated antennas, the others can be reception dedicated antennas, and the transmission antenna virtualization method and the reception antenna virtualization can be independently set. When all or some antennas are antennas for transmission and reception, an antenna virtualization scheme when an antenna operates as a transmission antenna and an antenna virtualization scheme when the antenna operates as a reception antenna may be differently applied to the antenna.

In addition, antenna virtualization may be defined per system. Furthermore, antenna virtualization may be defined per frequency even in the same system.

In the communication methods using a virtual antenna according to the present invention, described with reference to FIGS. 12 and 13, one of the various embodiments of the present invention or combinations thereof can be applied.

Figure 14:
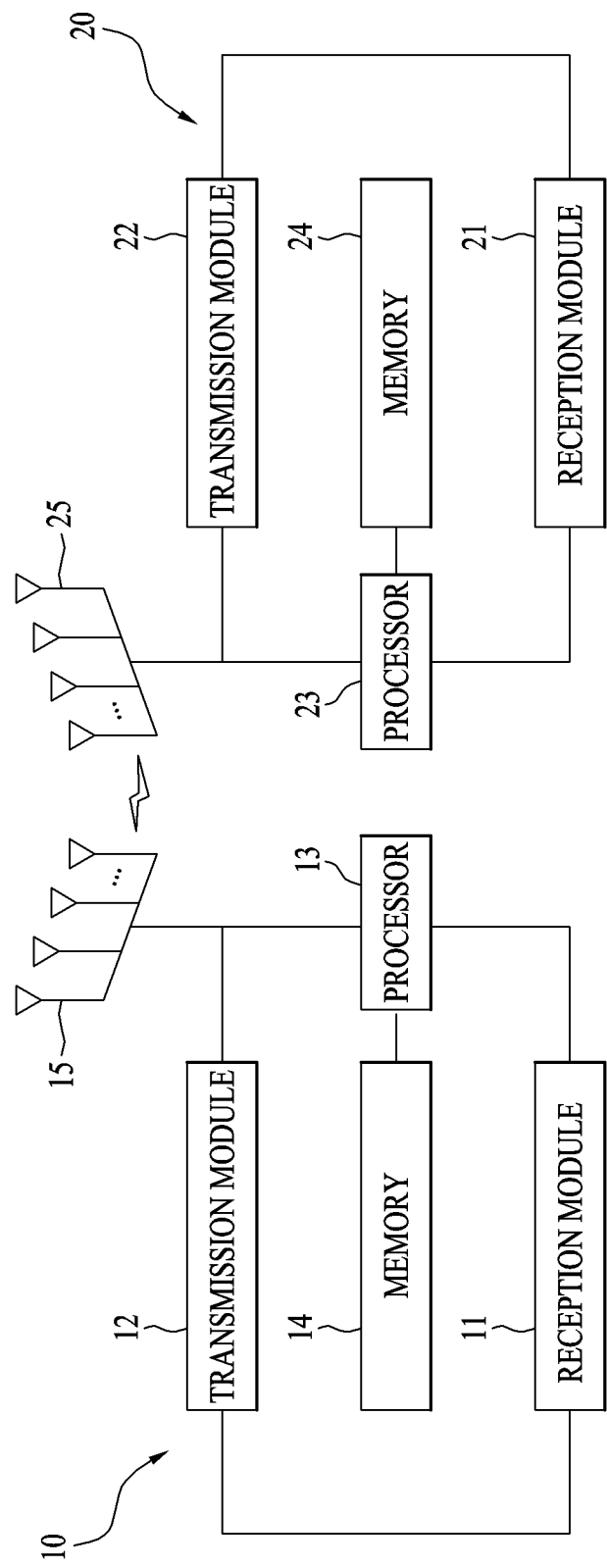
FIG. 14 illustrates configurations of a UE and a base station according to an embodiment of the present invention.

FIG. 14 illustrates a configuration of a UE and an eNB according to a preferred embodiment of the present invention.

Referring to FIG. 14, an eNB 10 according to the present invention may include a transmitter 11, a receiver 12, a processor 13, a memory 14 and a plurality of antennas 15. The transmitter 11 can transmit signals, data and information to an external device (e.g. UE). The receiver 12 can receive signals, data and information from an external device (e.g. UE). The processor 13 can control the overall operation of the eNB 10. The plurality of antennas 15 can be configured according to a two-dimensional antenna configuration.

The processor 13 of the eNB 10 according to an embodiment of the present invention can be configured to support antenna reconfiguration according to embodiments of the present invention. The processor 13 of the eNB 10 can control the eNB 10 to transmit information indicating whether an antenna reconfiguration request is authorized to the UE 20 using the transmitter 11 upon reception of the antenna reconfiguration request from the UE 20 using the receiver 12. When the information indicating whether the antenna reconfiguration request is authorized indicates authorization of the antenna reconfiguration request, antenna reconfiguration information can be transmitted from the UE 20. In this case, the processor 13 of the eNB 10 can control the eNB 10 to receive the antenna reconfiguration information using the receiver 12. In addition, the processor 13 of the eNB 10 may control the eNB 10 to transmit reconfiguration completion acknowledgement information to the UE 20 using the transmitter 11.

In addition, the processor 13 of the eNB 10 can process information received by the eNB 10, information to be transmitted to the outside and the like, and the memory 14 can store processed information for a predetermined time and may be replaced by a component such as a buffer (not shown).

Referring to FIG. 14, the UE 20 according to the present invention may include a transmitter 21, a receiver 22, a processor 23, a memory 24 and a plurality of antennas 25. The plurality of antennas 25 means that the UE 20 supports MIMO transmission and reception. The transmitter 21 can transmit signals, data and information to an external device (e.g. eNB). The receiver 22 can receive signals, data and information from an external device (e.g. eNB). The processor 23 can control the overall operation of the UE 20.

The processor 23 of the UE 20 according to an embodiment of the present invention can be configured to perform antenna reconfiguration according to embodiments of the present invention. The processor 23 of the UE 20 can control the UE 20 to transmit an antenna reconfiguration request to the eNB 10 using the transmitter 21 and to receive information indicating whether the antenna reconfiguration request is authorized from the eNB 10 using the receiver 22. When the information indicating whether the antenna reconfiguration request is authorized indicates authorization of the antenna reconfiguration request, the processor 23 can control the UE 20 to transmit antenna reconfiguration information to the eNB 10 using the transmitter 21. In addition, the processor 23 of the UE 20 can control the UE 20 to receive reconfiguration completion acknowledgement from the eNB 10 using the receiver 22.

In addition, the processor 23 of the UE 20 can process information received by the UE 20, information to be transmitted to the outside and the like, and the memory 24 can store processes information for a predetermined time and may be replaced by a component such as a buffer (not shown).

Configurations of the eNB 10 and the UE 20 can be implemented such that the above-described various embodiments of the present invention are independently applied or two or more thereof are simultaneously applied and redundant description is omitted for clarity.

While an eNB is exemplarily used as a downlink transmission entity or an uplink reception entity and a UE is exemplarily used as a downlink reception entity or an uplink transmission entity in description of various embodiments of the present invention, the scope or spirit of the present invention is not limited thereto. For example, description of the eNB can be equally applied to a case in which a cell, an antenna port, an antenna port group, an RRH, a transmission point, a reception point, an access point, a relay and the like are downlink transmission entities for downlink transmission to a UE or uplink reception entities for uplink reception from the UE. In addition, the principle of the present invention, described through various embodiments of the present invention, can be equally applied to a case in which a relay is a downlink transmission entity for downlink transmission to the UE or an uplink reception entity for uplink reception from the UE or a case in which the relay is an uplink transmission entity for uplink transmission to an eNB or a downlink reception entity for downlink reception from the eNB.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention can be applied to various mobile communication systems.

The invention claimed is:

1. A method for reconfiguring antennas of a terminal in a wireless communication system, comprising:
    transmitting, by the terminal, an antenna reconfiguration request to a base station;
    receiving, by the terminal from the base station, an authorization message indicating whether the antenna reconfiguration request is authorized; and
    transmitting, by the terminal, antenna reconfiguration information to the base station when the antenna reconfiguration request is authorized,
    wherein the antenna reconfiguration information includes information on an antenna virtualization pattern including a number of one or more physical antennas mapped to one virtual antenna, and
    wherein the number of one or more physical antennas mapped to one virtual antenna is determined to change a beamwidth based on moving speed of the terminal and moving direction of the terminal.

2. The method according to claim 1, wherein the information on the antenna virtualization pattern further includes at least one of a total number of transmission virtual antennas, a total number of reception virtual antennas, or information specifying the one or more physical antennas.

3. The method according to claim 1, wherein the number of one or more physical antennas mapped to the one virtual antenna is proportional to the moving speed of the terminal.

4. The method according to claim 1, wherein the number of one or more physical antennas mapped to one virtual antenna is determined further based on a movement state including at least one of whether the terminal is moving, an acceleration state, or a deceleration state.

5. The method according to claim 1, wherein the number of one or more physical antennas mapped to one virtual antenna is determined further based on a communication state including includes at least one of a distance between the terminal and the base station, relative locations of the terminal and the base station, or a channel state between the terminal and the base station.

6. The method according to claim 1, wherein the transmitting the antenna reconfiguration request is performed when the terminal does not perform data transmission and reception.

7. The method according to claim 1, wherein the number of one or more physical antennas mapped to one virtual antenna is determined further based on an arranging direction of the one or more physical antennas with respect to the moving direction of the terminal.

8. A method for supporting antenna reconfiguration of a terminal by a base station in a wireless communication system, comprising:
   receiving, by the base station, an antenna reconfiguration request from the terminal;
   transmitting, by the base station to the terminal, an authorization message indicating whether the antenna reconfiguration request is authorized; and
   receiving, by the base station, antenna reconfiguration information from the terminal,
   wherein the antenna reconfiguration information includes information on an antenna virtualization pattern including a number of one or more physical antennas mapped to one virtual antenna, and
   wherein the number of one or more physical antennas mapped to one virtual antenna is determined to change a beamwidth based on moving speed of the terminal and moving direction of the terminal.

9. A terminal performing antenna reconfiguration in a wireless communication system, comprising:
   a transmitter;
   a receiver; and
   a processor,
   wherein the processor is configured to:
   control the transmitter to transmit an antenna reconfiguration request to a base station;
   control the receiver to receive, from the base station, an authorization message indicating whether the antenna reconfiguration request is authorized; and
   control the transmitter to transmit antenna reconfiguration information to the base station when the antenna reconfiguration request is authorized,
   wherein the antenna reconfiguration information includes information on an antenna virtualization pattern including a number of one or more physical antennas mapped to one virtual antenna, and
   wherein the number of one or more physical antennas mapped to one virtual antenna is determined to change a beamwidth based on moving speed of the terminal and moving direction of the terminal.

10. A base station supporting antenna reconfiguration of a terminal in a wireless communication system, comprising:
    a transmitter;
    a receiver; and
    a processor,
    wherein the processor is configured to:
    control the receiver to receive;
    control the transmitter to transmit, to the terminal, an authorization message indicating whether the antenna reconfiguration request is authorized; and
    control the receiver to receive antenna reconfiguration information from the terminal,
    wherein the antenna reconfiguration information includes information on an antenna virtualization pattern including a number of one or more physical antennas mapped to one virtual antenna, and
    wherein the number of one or more physical antennas mapped to one virtual antenna is determined to change a beamwidth based on moving speed of the terminal and moving direction of the terminal.

* * * * *